United States Patent
Mankowski

(10) Patent No.: US 9,342,671 B2
(45) Date of Patent: May 17, 2016

(54) PASSWORD BY TOUCH-LESS GESTURE

(71) Applicant: BLACKBERRY LIMITED, Waterloo (CA)

(72) Inventor: Peter Mankowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/932,243

(22) Filed: Jul. 1, 2013

(65) Prior Publication Data
US 2015/0007308 A1  Jan. 1, 2015

(51) Int. Cl.
*G06F 21/31* (2013.01)

(52) U.S. Cl.
CPC ...................................... *G06F 21/31* (2013.01)

(58) Field of Classification Search
USPC ............ 726/19, 2, 21, 36; 713/150, 163, 181; 380/255, 264, 276
See application file for complete search history.

(56) References Cited

U.S. PATENT DOCUMENTS

| | | |
|---|---|---|
| 5,252,951 A | 10/1993 | Tannenbaum et al. |
| 5,554,912 A | 9/1996 | Thayer et al. |
| 5,594,469 A | 1/1997 | Freeman et al. |
| 6,693,612 B1 | 2/2004 | Matsumoto et al. |
| 7,618,323 B2 | 11/2009 | Rothschild et al. |
| 7,620,316 B2 | 11/2009 | Boillot |
| 8,035,614 B2 | 10/2011 | Bell et al. |
| 8,363,157 B1 | 1/2013 | Han |
| 8,694,062 B2 | 4/2014 | Omerovic |
| 8,964,062 B1 | 2/2015 | Neglur |
| 9,063,574 B1 | 6/2015 | Ivanchenko |
| 2002/0093491 A1 | 7/2002 | Gillespie et al. |
| 2003/0112228 A1 | 6/2003 | Gillespie et al. |
| 2003/0156100 A1 | 8/2003 | Gettemy |
| 2004/0178997 A1 | 9/2004 | Gillespie et al. |
| 2004/0190776 A1 | 9/2004 | Higaki et al. |
| 2006/0013440 A1 | 1/2006 | Cohen et al. |
| 2006/0092142 A1 | 5/2006 | Gillespie et al. |
| 2006/0139185 A1 | 6/2006 | Bonnat et al. |
| 2006/0187214 A1 | 8/2006 | Gillespie et al. |

(Continued)

FOREIGN PATENT DOCUMENTS

| | | |
|---|---|---|
| EP | 0538705 A1 | 4/1993 |
| EP | 2226710 A2 | 9/2010 |
| WO | 2012140593 A2 | 10/2012 |

OTHER PUBLICATIONS

Liao et al., "PACER: Fine-grained Interactive Paper via Camera-touch Hybrid Gestures on a Cell Phone", CHI 2010: Displays Where You Least Expect Them, Apr. 10-15, 2010, pp. 1-10.

(Continued)

*Primary Examiner* — Jason K. Gee
*Assistant Examiner* — Sharif E Ullah
(74) *Attorney, Agent, or Firm* — Conley Rose, P.C.; J. Robert Brown, Jr.

(57) ABSTRACT

A device and method to use a password by touch-less gesture are described. The device includes two or more ambient light sensors arranged at respective surface locations of the device, each of the two or more ambient light sensors measuring light intensity at the respective surface location. The device also includes a first processor to execute a password application on the device, and a second processor to detect two or more gestures performed by an object in touch-less communication with the device and define or verify a password based on the two or more gestures.

20 Claims, 11 Drawing Sheets

(56) References Cited

U.S. PATENT DOCUMENTS

| | | |
|---|---|---|
| 2006/0279548 A1 | 12/2006 | Geaghan |
| 2007/0075965 A1* | 4/2007 | Huppi ............... H04M 1/72563 345/156 |
| 2007/0120996 A1 | 5/2007 | Boillot |
| 2007/0130547 A1* | 6/2007 | Boillot .................... G06F 3/017 715/863 |
| 2007/0259716 A1 | 11/2007 | Mattice et al. |
| 2007/0259717 A1 | 11/2007 | Mattice et al. |
| 2007/0296867 A1 | 12/2007 | Park |
| 2008/0005703 A1 | 1/2008 | Radivojevic et al. |
| 2008/0041640 A1 | 2/2008 | Gillespie et al. |
| 2008/0042994 A1 | 2/2008 | Gillespie et al. |
| 2008/0048997 A1 | 2/2008 | Gillespie et al. |
| 2008/0122803 A1 | 5/2008 | Izadi et al. |
| 2008/0134102 A1 | 6/2008 | Movold et al. |
| 2008/0165145 A1 | 7/2008 | Herz et al. |
| 2008/0165160 A1 | 7/2008 | Kocienda et al. |
| 2008/0168402 A1 | 7/2008 | Blumenberg |
| 2008/0266083 A1 | 10/2008 | Midholt et al. |
| 2009/0031258 A1 | 1/2009 | Arrasvuori et al. |
| 2009/0051648 A1 | 2/2009 | Shamaie et al. |
| 2009/0058830 A1 | 3/2009 | Herz et al. |
| 2009/0074248 A1 | 3/2009 | Cohen et al. |
| 2009/0077504 A1 | 3/2009 | Bell et al. |
| 2009/0100383 A1 | 4/2009 | Sunday et al. |
| 2009/0139778 A1 | 6/2009 | Butler et al. |
| 2009/0146982 A1 | 6/2009 | Thielman et al. |
| 2009/0189858 A1 | 7/2009 | Lev et al. |
| 2009/0195497 A1 | 8/2009 | Fitzgerald et al. |
| 2010/0027843 A1 | 2/2010 | Wilson |
| 2010/0060611 A1 | 3/2010 | Nie |
| 2010/0090947 A1 | 4/2010 | Underkoffler et al. |
| 2010/0150399 A1 | 6/2010 | Svajda et al. |
| 2010/0153996 A1 | 6/2010 | Migos et al. |
| 2010/0156676 A1 | 6/2010 | Mooring et al. |
| 2010/0177060 A1 | 7/2010 | Han |
| 2010/0188328 A1 | 7/2010 | Dodge et al. |
| 2010/0192105 A1 | 7/2010 | Kim et al. |
| 2010/0244751 A1 | 9/2010 | Van Endert |
| 2010/0245289 A1 | 9/2010 | Svajda |
| 2010/0253241 A1 | 10/2010 | Van Endert |
| 2010/0277073 A1 | 11/2010 | Van Endert |
| 2010/0313050 A1 | 12/2010 | Harrat et al. |
| 2010/0325575 A1 | 12/2010 | Platzer et al. |
| 2011/0010626 A1 | 1/2011 | Fino et al. |
| 2011/0029913 A1 | 2/2011 | Boillot et al. |
| 2011/0096009 A1 | 4/2011 | Kurokawa et al. |
| 2011/0140610 A1 | 6/2011 | Van Endert |
| 2011/0157016 A1 | 6/2011 | Chang |
| 2011/0163947 A1 | 7/2011 | Shaw et al. |
| 2011/0167391 A1 | 7/2011 | Momeyer et al. |
| 2011/0180709 A1 | 7/2011 | Craddock et al. |
| 2011/0182519 A1 | 7/2011 | Craddock et al. |
| 2011/0185309 A1 | 7/2011 | Challinor et al. |
| 2011/0187640 A1 | 8/2011 | Jacobsen et al. |
| 2011/0211073 A1 | 9/2011 | Foster |
| 2011/0215733 A1 | 9/2011 | Van Endert |
| 2011/0221666 A1 | 9/2011 | Newton et al. |
| 2011/0221669 A1 | 9/2011 | Shams et al. |
| 2011/0248151 A1 | 10/2011 | Holcombe et al. |
| 2011/0248961 A1 | 10/2011 | Svajda et al. |
| 2011/0254864 A1 | 10/2011 | Tsuchikawa et al. |
| 2011/0291988 A1 | 12/2011 | Bamji et al. |
| 2011/0296353 A1 | 12/2011 | Ahmed et al. |
| 2011/0298754 A1 | 12/2011 | Bove et al. |
| 2011/0306304 A1 | 12/2011 | Forutanpour et al. |
| 2011/0310005 A1 | 12/2011 | Chen et al. |
| 2011/0314429 A1 | 12/2011 | Blumenberg |
| 2011/0314430 A1 | 12/2011 | Blumenberg |
| 2012/0007821 A1 | 1/2012 | Zaliva |
| 2012/0007833 A1 | 1/2012 | Liu et al. |
| 2012/0013529 A1 | 1/2012 | McGibney et al. |
| 2012/0013539 A1 | 1/2012 | Hogan et al. |
| 2012/0013540 A1 | 1/2012 | Hogan |
| 2012/0023443 A1 | 1/2012 | Blumenberg |
| 2012/0023460 A1 | 1/2012 | Blumenberg |
| 2012/0023461 A1 | 1/2012 | Blumenberg |
| 2012/0023509 A1 | 1/2012 | Blumenberg |
| 2012/0050007 A1 | 3/2012 | Forutanpour et al. |
| 2012/0056804 A1 | 3/2012 | Radivojevic et al. |
| 2012/0089948 A1 | 4/2012 | Lim et al. |
| 2012/0133580 A1 | 5/2012 | Kirby et al. |
| 2012/0162636 A1 | 6/2012 | Sy |
| 2012/0176303 A1 | 7/2012 | Miyake |
| 2012/0176401 A1 | 7/2012 | Hayward et al. |
| 2012/0200486 A1 | 8/2012 | Meinel et al. |
| 2012/0206339 A1 | 8/2012 | Dahl |
| 2012/0242584 A1 | 9/2012 | Tuli |
| 2012/0242852 A1 | 9/2012 | Hayward et al. |
| 2012/0245886 A1 | 9/2012 | Zhang et al. |
| 2012/0280107 A1 | 11/2012 | Skurnik et al. |
| 2012/0280900 A1 | 11/2012 | Wang et al. |
| 2012/0280904 A1 | 11/2012 | Skurnik et al. |
| 2012/0280905 A1 | 11/2012 | Vonog et al. |
| 2012/0281129 A1 | 11/2012 | Wang et al. |
| 2012/0282974 A1 | 11/2012 | Green et al. |
| 2012/0287044 A1 | 11/2012 | Bell et al. |
| 2012/0293404 A1 | 11/2012 | Federico et al. |
| 2012/0306815 A1 | 12/2012 | Su et al. |
| 2012/0312956 A1 | 12/2012 | Chang et al. |
| 2012/0317511 A1 | 12/2012 | Bell |
| 2013/0002538 A1 | 1/2013 | Mooring et al. |
| 2013/0002601 A1 | 1/2013 | McCracken |
| 2013/0004016 A1 | 1/2013 | Karakotsios et al. |
| 2013/0009896 A1 | 1/2013 | Zaliva |
| 2013/0022214 A1 | 1/2013 | Dickins et al. |
| 2013/0033418 A1 | 2/2013 | Bevilacqua et al. |
| 2013/0034265 A1 | 2/2013 | Nakasu et al. |
| 2013/0053007 A1 | 2/2013 | Cosman et al. |
| 2013/0067419 A1 | 3/2013 | Eltoft |
| 2013/0083252 A1 | 4/2013 | Boyes |
| 2013/0091561 A1* | 4/2013 | Bruso et al. ...................... 726/16 |
| 2013/0093727 A1 | 4/2013 | Eriksson et al. |
| 2013/0100036 A1 | 4/2013 | Papakipos et al. |
| 2013/0102366 A1 | 4/2013 | Teng et al. |
| 2013/0145535 A1 | 6/2013 | Parsons et al. |
| 2013/0167221 A1* | 6/2013 | Vukoszavlyev et al. ........ 726/16 |
| 2013/0182246 A1 | 7/2013 | Tanase |
| 2013/0307949 A1 | 11/2013 | Zhang et al. |
| 2013/0328761 A1* | 12/2013 | Boulanger et al. ............ 345/156 |
| 2013/0328842 A1 | 12/2013 | Barnhoefer et al. |
| 2014/0118257 A1 | 5/2014 | Baldwin |
| 2014/0237432 A1 | 8/2014 | Geurts et al. |
| 2014/0253427 A1 | 9/2014 | Gruhlke et al. |
| 2014/0306877 A1 | 10/2014 | Katz et al. |
| 2015/0009290 A1 | 1/2015 | Mankowski et al. |

OTHER PUBLICATIONS

Extended European Search Report for EP Application No. 13174561.4-1960, dated Jan. 3, 2014, pp. 1-8.
Extended European Search Report for EP Application No. 13174558.0-1960, dated Jan. 3, 2014, pp. 1-10.
Extended European Search Report for EP Application No. 13174576.2-1960, dated Jan. 3, 2014, pp. 1-12.
Extended European Search Report for EP Application No. 13174560.6-1960, dated Jan. 3, 2014, pp. 1-10.
Extended European Search Report for EP Application No. 13174575.4-1960, dated Jan. 3, 2014, pp. 1-9.
Extended European Search Report for EP Application No. 13175807.0-1960, dated Jan. 15, 2014, pp. 1-7.
Extended European Search Report for EP Application No. 13174565.5-1959, dated Dec. 6, 2013, pp. 1-7.
Extended European Search Report for EP Application No. 13174557.2-1956, dated Dec. 13, 2013, pp. 1-7.
Extended European Search Report for EP Application No. 13174577.0-1560 dated Dec. 13, 2013, pp. 1-7.
Office Action dated Jun. 2, 2015; U.S. Appl. No. 13/932,487 filed Jul. 1, 2013; 47 pages.
Final Office Action dated Mar. 4, 2015; U.S. Appl. No. 13/932,260, filed Jul. 1, 2013; 55 pages.
Final Office Action dated Mar. 31, 2015; U.S. Appl. No. 13/937,444, filed Jul. 9, 2013; 20 pages.

(56) References Cited

OTHER PUBLICATIONS

Office Action dated May 14, 2015; U.S. Appl. No. 13/949,748, filed Jul. 24, 2013; 50 pages.
Office Action dated Apr. 14, 2015; U.S. Appl. No. 13/949,727, filed Jul. 24, 2013; 44 pages.
Mankowski, Peter, et al.; U.S. Appl. No. 13/932,470; filed Jul. 1, 2013; Title: Gesture Detection Using Ambient Light Sensors.
Mankowski, Peter, et al.; U.S Appl. No. 13/932,235, filed Jul. 1, 2013; Title: Performance Control of Ambient Light Sensors.
Mankowski, Peter; U.S. Appl. No. 13/932,250, filed Jul. 1, 2013; Title: Touch-Less User Interface Using Ambient Light Sensors.
Mankowski, Peter; U.S. Appl. No. 13/932,487, filed Jul. 1, 2013; Title: Gesture Detection Using Ambient Light Sensors.
Mankowski, Peter; U.S. Appl. No. 13/932,260, filed Jul. 1, 2013; Title: Camera Control Using Ambient Light Sensors.
Mankowski, Peter; U.S. Appl. No. 13/932,271, filed Jul. 1, 2013; Title: Display Navigation Using Touch-Less Gestures.
Mankowski, Peter; U.S. Appl. No. 13/932,280, filed Jul. 1, 2013; Title: Alarm Operation by Touch-Less Gesture.
Mankowski, Peter; U.S. Appl. No. 13/937,444, filed Jul. 9, 2013; Title: Operating a Device Using Touchless and Touchscreen Gestures.
Carmel-Veilleux, Tennessee; U.S. Appl. No. 14/019,740, filed Sep. 6, 2013; Title: Device Having Light Intensity Measurement in Presence of Shadows; 27 pages.
Holenarsipur, Prashanth, et al.; "Ambient-Light Sensing Optimizes Visibility and Battery Life of Portable Displays"; Maxim: Application Note 5051; Jun. 20, 2011; 7 pages.
Office Action dated Sep. 3, 2014; U.S. Appl. No. 13/932,260, filed Jul. 1, 2013; 48 pages.
Office Action dated Nov. 20, 2014; U.S. Appl. No. 13/932,271, filed Jul. 1, 2013; 35 pages.
Office Action dated Oct. 29, 2014; U.S. Appl. No. 13/937,444, filed Jul. 9, 2013; 28 pages.
European Extended Search Report; Application No. 14183709.6; Jan. 26, 2015; 7 pages.
Mankowski, Peter, et al.; U.S. Appl. No. 13/949,748, filed Jul. 24, 2013; Title: Backlight for Touchless Gesture Detection.
Mankowski, Peter, et al.; U.S. Appl. No. 13/949,727, filed Jul. 24, 2013; Title: Backlight for Touchless Gesture Detection.
EE Times; "Ambient Light Sensors Adjust LCD Brightness to Save Battery Power"; http://www.eetimes.com/document.asp?doc_id=1302779&print=yes; Dec. 26, 2006; 2 pages.
ROHM Semiconductor; "Ambient Light Sensor (ALS) Applications in Portable Electronics"; http://www.rohm.com/documents/11303/41217/CNA09016_wp.pdf; Jul. 24, 2013; 9 pages.
European Extended Search Report; Application No. 14178207.8; Dec. 23, 2014; 6 pages.
Office Action dated Jun. 30, 2015; U.S. Appl. No. 13/932,470, filed Jul. 1, 2013; 51 pages.
Office Action dated Jun. 18, 2015; U.S. Appl. No. 13/932,235, filed Jul. 1, 2013; 41 pages.
Office Action dated Jun. 11, 2015; U.S. Appl. No. 13/932,250, filed Jul. 1, 2013; 53 pages.
Office Action dated Jul. 27, 2015; U.S. Appl. No. 13/932,260, filed Jul. 1, 2013; 70 pages.
Final Office Action dated Jun. 18, 2015; U.S. Appl. No. 13/932,271, filed Jul. 1, 2013; 34 pages.
Office Action dated Jun. 29, 2015; U.S. Appl. No. 13/932,280, filed Jul. 1, 2013; 45 pages.
Advisory Action dated Jun. 8, 2015; U.S. Appl. No. 13/937,444, filed Jul. 9, 2013; 6 pages.
Final Office Action dated Aug. 21, 2015; U.S. Appl. No. 13/949,727, filed Jul. 24, 2013; 17 pages.
Notice of Allowance dated Jul. 22, 2015; U.S. Appl. No. 14/019,740, filed Sep. 6, 2013; 39 pages.
Notice of Allowance dated Nov. 6, 2015; U.S. Appl. No. 13/932,470, filed Jul. 1, 2013; 13 pages.
Notice of Allowance dated Sep. 29, 2015; U.S. Appl. No. 13/932,487, filed Jul. 1, 2013; 16 pages.
Final Office Action dated Nov. 24, 2015; U.S. Appl. No. 13/932,260, filed Jul. 1, 2013; 36 pages.
Advisory Action dated Sep. 10, 2015; U.S. Appl. No. 13/932,271, filed Jul. 1, 2013; 3 pages.
Office Action dated Nov. 4, 2015; U.S Appl. No. 13/932,271, filed Jul. 1, 2013; 21 pages.
Office Action dated Oct. 9, 2015; U.S. Appl. No. 13/932,280, filed Jul. 1, 2013; 13 pages.
Office Action dated Sep. 18, 2015; U.S. Appl. No. 13/937,444, filed Jul. 9, 2013; 18 pages.
Final Office Action dated Nov. 20, 2015; U.S. Appl. No. 13/949,748, filed Jul. 24, 2013; 19 pages.
Advisory Action dated Oct. 27, 2015; U.S. Appl. No. 13/949,727, filed Jul. 24, 2013; 3 pages.
Pyreos, "Pioneering Low Power Gesture Sensor Enabling Touchless Control for Mobile Devices" [online]; retrieved Jun. 27, 2013; retrieved from http://www.pyreos.com/images/downloads/Applications/Touchless%20Gesture%20Control/Gesture%20Sensor%20FAQs.pdf pp. 1-2.
Silicon Labs, "Touchless Gesturing Brings New Innovation to Electronic Product Designs" [online]; retrieved Jun. 27, 2013; retrieved from http://www.silabs.com/Support%20Documents/TechnicalDocs/TouchlessSensorIC-WP.pdf pp. 1-4.
Taos, "Light-to-Digital Converter" The Lumenology Company, TAOS132, Mar. 2012, pp. 1-24.
Notice of Allowance dated Mar. 21, 2016; U.S. Appl. No. 13/932,260, filed Jul. 1, 2013; 68 pages.
Final Office Action dated Jan. 20, 2016; U.S. Appl. No. 13/932,235, filed Jul. 1, 2013; 16 pages.
Final Office Action dated Dec. 21, 2015; U.S. Appl. No. 13/932,250, filed Jul. 1, 2013; 31 pages.
Advisory Action dated Mar. 2, 2016; U.S. Appl. No. 13/932,250, filed Jul. 1, 2013; 3 pages.
Advisory Action dated Feb. 9, 2016; U.S. Appl. No. 13/932,260, filed Jul. 1, 2013; 8 pages.
Notice of Allowance dated Feb. 17, 2016; U.S. Appl. No. 13/932,280, filed Jul. 1, 2013; 12 pages.
Notice of Allowance dated Mar. 18, 2016; U.S. Appl. No. 13/937,444, filed Jul. 9, 2013; 15 pages.
Notice of Allowance dated Feb. 1, 2016; U.S. Appl. No. 13/949,748, filed Jul. 24, 2013; 13 pages.
Advisory Action dated Dec. 31, 2015; U.S. Appl. No. 13/949,727, filed Jul. 24, 2013; 13 pages.
Advisory Action dated Feb. 25, 2016; U.S. Appl. No. 13/949,727, filed Jul. 24, 2013; 2 pages.
Office Action dated Mar. 9, 2016; U.S. Appl. No. 13/949,727, filed Jul. 24, 2013; 10 pages.
European Examination Report; Application No. 13174565.5; Feb. 18, 2016; 8 pages.

* cited by examiner

PASSWORD BY TOUCH-LESS GESTURE

BACKGROUND

Many computing and communication devices facilitate locking the device to prevent unauthorized use. Typically, the locking is accomplished via a series of keyboard or touch-screen entries. Once the device is locked, an authorized user must input a password to recover full functionality of the device. This password input is also typically done via keyboard or touch-screen entries.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, many devices facilitate locking or disabling most or all of the device functionality and require password entry to regain full functionality of the device. The password entry is typically done via a keyboard or touch-screen input. However, these methods of password input may be difficult in many circumstances. For example, in some work environments (e.g., oil rig, operating room), an authorized user of a device may not have hands clean enough to operate a touch-screen input, touchpad, or keyboard. In other environments, such as the operating room or in low temperature locations, an authorized user may not want to remove gloves in order to operate a touch-screen or small keyboard. A system and method to recognize gestures is described herein. In addition, embodiments describe a system and method to facilitate password input using touch-less gestures.

Figure 1:
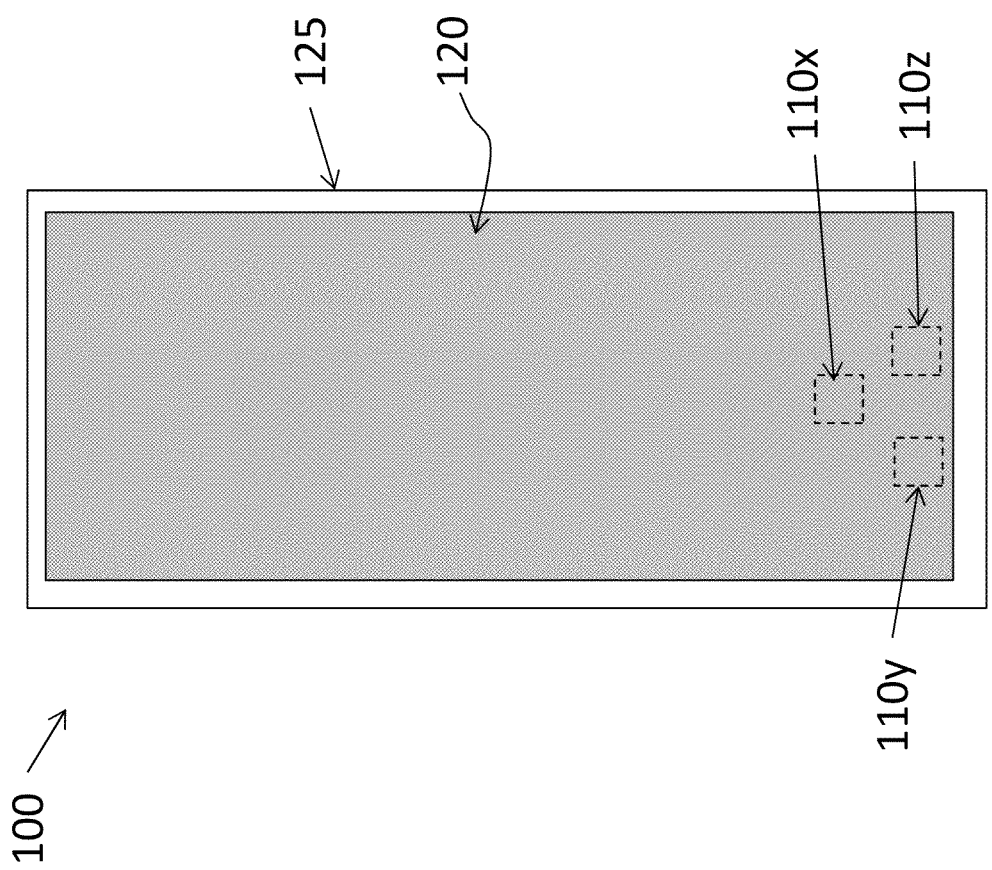
FIG. 1 shows a device including an exemplary arrangement of ambient light sensors.

FIG. 1 shows a device 100 including an exemplary arrangement of ambient light sensors 110. The device 100 may be any computation, communication, or data storage device such as a tablet, laptop computer, smart phone, music player, storage device, and the like. The view depicted by FIG. 1 shows the screen 120 (e.g., glass or other transparent surface) of the device 100 on a surface of the body 125 that displays information to a user, which can be based on user selections or generated by the device 100. Information generated by the device can include the status of communication connections (mobile network, wifi connection(s), Bluetooth connections, etc.), telephone call, or electronic messages or any combination thereof. The screen 120 can act as the input/output (I/O) between the device 100 and the user. The exemplary device 100 shown in FIG. 1 has a screen 120 that occupies most of one surface of the device 100. Other exemplary devices 100 may instead include a keyboard or other components such that the relative size of the screen 120 to the size of a surface of the device 100 is smaller than shown in FIG. 1 (see e.g., FIG. 4). Three ambient light sensors (ALSs) 110x, 110y, 110z are disposed beneath the screen 120 in FIG. 1. Although the ALSs 110 are shown disposed beneath the screen 120 to protect from environmental and accidental damage, the ALSs 110 receive the same intensity of ambient light or at least sufficient ambient light to detect a change in ambient light whether they are disposed above or below the screen 120, because the screen 120 is a transparent device element that allows ambient light to pass through. The screen 120 includes a glass or polymer exterior layer that may filter or diffuse some light, e.g., certain ranges of light wavelengths. Sufficient light for detection as described herein passes through the exterior layer of the screen 120. The ambient light refers to the available light (brightness and direction of light) in the environment in which the device 100 is being used. As such, the ALSs 110 are passive devices. In an example, the ALSs 110 do not have and are not associated with emitters on the device 100 to provide the light that is detected by the ALSs 110. In a further example, the device 100 does not emit light for the purpose of gesture detection. Ambient light is, in an example, the light present in the environment in which the device is present.

Figure 2:
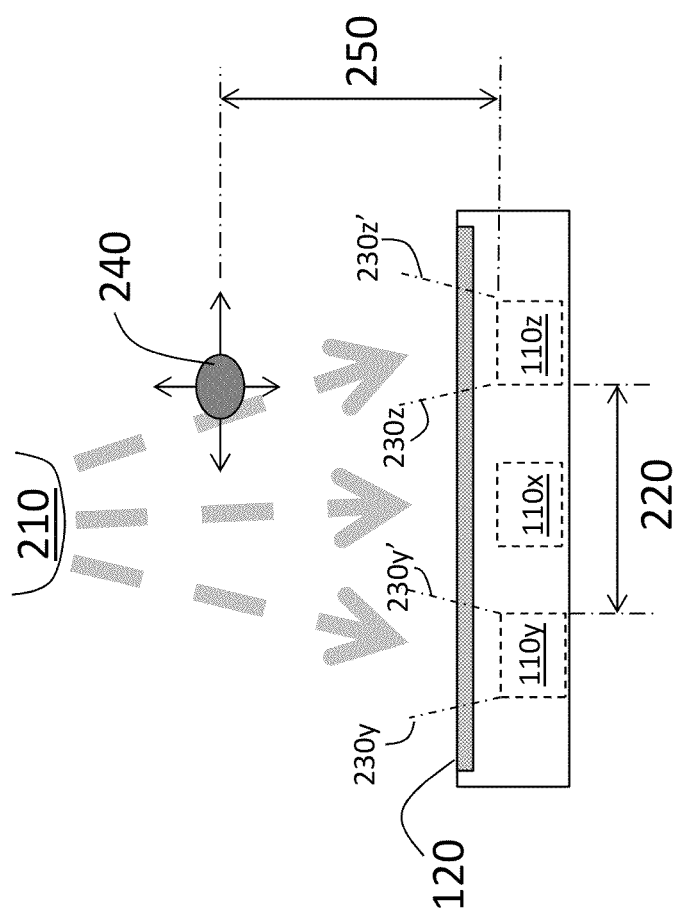
FIG. 2 depicts another view of the device shown in FIG. 1.

FIG. 2 depicts another view of the device 100 shown in FIG. 1. The view shown by FIG. 2 includes a light source 210. This light source 210 may be the sun, a lamp, or some combination of light sources that provide the available light in a given environment in which the device 100 is being used. If the device 100 is outside during the day, the sun provides the ambient light, which is spread spectrum light. If the device is being used indoors with no exterior windows, the ambient light is generated by indoor lighting systems, e.g. lamps, fluorescent bulbs, incandescent bulbs, LEDs, etc. The ambient light can also be a combination of natural light (e.g., sunlight) and artificial light (e.g., fluorescent light, incandescent light). Each ALS 110 outputs a current level corresponding with the measured light intensity 115 (see e.g., FIG. 5). An analog-to-digital converter may be used to derive a digital output from the ALSs 110. Each of the ALSs 110 may have adjustable sensitivity (adjustable gain setting). Each ALS 110 may also be a spread spectrum sensor with a selectable range of operation among two or more ranges (wavelength bands or ranges). The process entailed in this selection is discussed further below with reference to FIG. 6. The full range of operation of each ALS 110 may be close to the wavelength range of visible light (400 nm to 700 nm). A typical commercially available ALS may detect ambient light in the wavelength range of 350 nm to 700 nm, for example. Because each ALS 110 measures the intensity of the available (ambient) light within its zone of reception (see e.g. 230$y$ and 230$y'$ defining a zone of reception for ALS 110$y$ and 230$z$ and 230$z'$ defining a zone of reception for ALS 110$z$), the ALS 110 is a passive sensor that does not require a corresponding emitter or transmitter. The zone of reception is typically cone-shaped with the cone dimensions being determined by an angle of half sensitivity. FIG. 2 is a cross-sectional view of an exemplary zone of reception. Each ALS 110 may measure light intensity 115 within its zone of reception in a photometric unit (lux) to provide a measure of lumens per square-meters or in a radiometric unit (irradiance) to provide a measure of watts per square-meters. In the embodiment shown by FIGS. 1 and 2, the three ALSs 110$x$, 110$y$, 110$z$ are arranged in a triangular pattern. That is, at least one ALS 110 is offset or not linearly aligned with at least two other ALSs 110.

Through the inclusion of two or more ALSs 110 (e.g., three ALSs 110$x$, 110$y$, 110$z$), the device 100 shown in FIGS. 1 and 2 facilitates detection of a gesture by an object 240 that changes the light intensity 115 (see e.g., FIG. 5) in the zone of detection of one or more of the ALSs 110 due to movement of the object 240. Through the inclusion of three or more ALSs 110 with at least three of the three of more ALSs 110 in a triangular pattern (see e.g., FIG. 1), movement of an object 240 may be discerned in three dimensions. As is further detailed below, a gesture is detected and identified based on the changes in light intensity 115 measured by each of the ALSs 110 at different time instants or measurement cycles due to the movement of the object 240. That is, each of the ALSs 110 measures light intensity 115 simultaneously with the other ALSs 110 at a given time instant or in sequence with the other ALSs 110 for a measurement cycle, and the comparison of light intensity 115 measurements for different time instants or measurement cycles is used to detect a gesture. For example, assuming that the ALSs 110 measure light intensity 115 simultaneously (or near-simultaneously), at the time instant illustrated by FIG. 2, the object 240 is positioned such that the light intensity 115 detected by ALS 110$z$ is affected but the light intensity 115 detected by ALSs 110$x$ and 110$y$ is unaffected by the object 240. Based on a direction of movement of the object 240, the light intensity 115 detected by different ones of the ALSs 110$x$, 110$y$, 110$z$ may be affected at different times instants by the position of the object 240. The object 240 may be a hand, one or more fingers, a wand or another non-transparent item that partially or completely blocks the passage of ambient light so that its position may be detected based on the effect on measured light intensity 115.

A touch-free gesture may mimic a swipe, also known as a flick, which can be a particular type of touch on a touch-sensitive display. The swipe or flick may begin at an origin point and continue to an end point, for example, a concluding end of the gesture. A gesture may be identified by attributes or characteristics of the gesture as discussed further below. These attributes may include the origin point (of detection by an ALS 110), the end point, the distance travelled by the object 240, the duration, the velocity, and the direction, for example. A gesture may be long or short in distance and/or duration. Two points of the gesture may be utilized to determine a direction of the gesture. A gesture may also include a hover. A hover may be non-movement of the object 240 at a location that is generally unchanged over a period of time.

In the arrangement of ALSs 110 shown in FIGS. 1 and 2, a minimum distance may be required among the ALSs 110$x$, 110$y$, and 110$z$ (e.g., distance 220 between ALSs 110$y$ and 110$z$) in order to distinguish the movement of the object 240. This minimum distance may generally be on the order of 2 centimeters (cm). More specifically, the minimum distance between ALSs 110 is based on an expected size of the object 240 as one factor. For example, when an open hand is used as the object 240, a greater minimum distance may be required to distinguish a gesture than when one finger is used as the object 240. This is because the open hand would cover all three ALSs 110$x$, 110$y$, 110$z$ at more time instants such that a movement of the open hand could only be distinguished when the object 240 is at an edge of the set of ALSs 110$x$, 110$y$, 110$z$. According to one or more embodiments, the ALSs 110 may be positioned at the corners or along the edges of the screen 120 and, thus, the screen 120 size may determine the distance between the ALSs 110. When an open hand is anticipated to be the object 240 used to perform a gesture, a minimum distance between ALSs 110 of 3.5 cm may be used. The increased distance between ALSs 110 facilitates distinguishing the gesture (e.g., direction, speed) more clearly, because all ALSs 110 will not be covered by the open hand object 240 for the majority of the gesture movement.

Another distance that must be considered is the distance between the object 240 and the ALS 110 (e.g., distance 250 between the object 240 and ALS 110$z$). First, as FIG. 2 makes clear, the object 240 must be between the light source 210 and the ALSs 110 in order to be detected by one or more of the ALSs 110 based on the effect of the object 240 on light intensity 115 detected by one or more of the ALSs 110. While a minimum distance is generally not required between the object 240 and an ALS 110 (i.e. the object 240 may almost touch the screen 120 surface), the object 240 may generally be 2-3 cm away from the screen 120 while performing the gesture. When the object 240 is too close to the ALSs 110 (screen 120 surface), then some portion of the beginning or end of a gesture may not be detected. This is due to the fact that the width of the zone of reception of the ALSs 110 (as shown in the cross-sectional depiction of FIG. 2 by 230$y$ and 230$y'$ and by 230$z$ and 230$z'$, for example) is narrowest at the surface of the ALSs 110 and increases with increased distance from the ALSs. Thus, as is clear from FIG. 2, an object 240 that is closer in distance to an ALS 110 (screen 120 surface) must also be closer to a center of the ALS 110 (in the perpendicular dimension, along the screen 120) in order to enter the zone of reception of the ALS 110. By hovering the object 240 above a given ALS 110 and moving it farther away (reducing the object 240 effect and increasing light intensity 115 measurement) or closer together (increasing the object 240 effect and decreasing light intensity 115 measurement), a gesture analogous to a mouse click may be made. Thus, double-click and triple-click gestures may be added to available distinguishable gestures.

Figure 3:
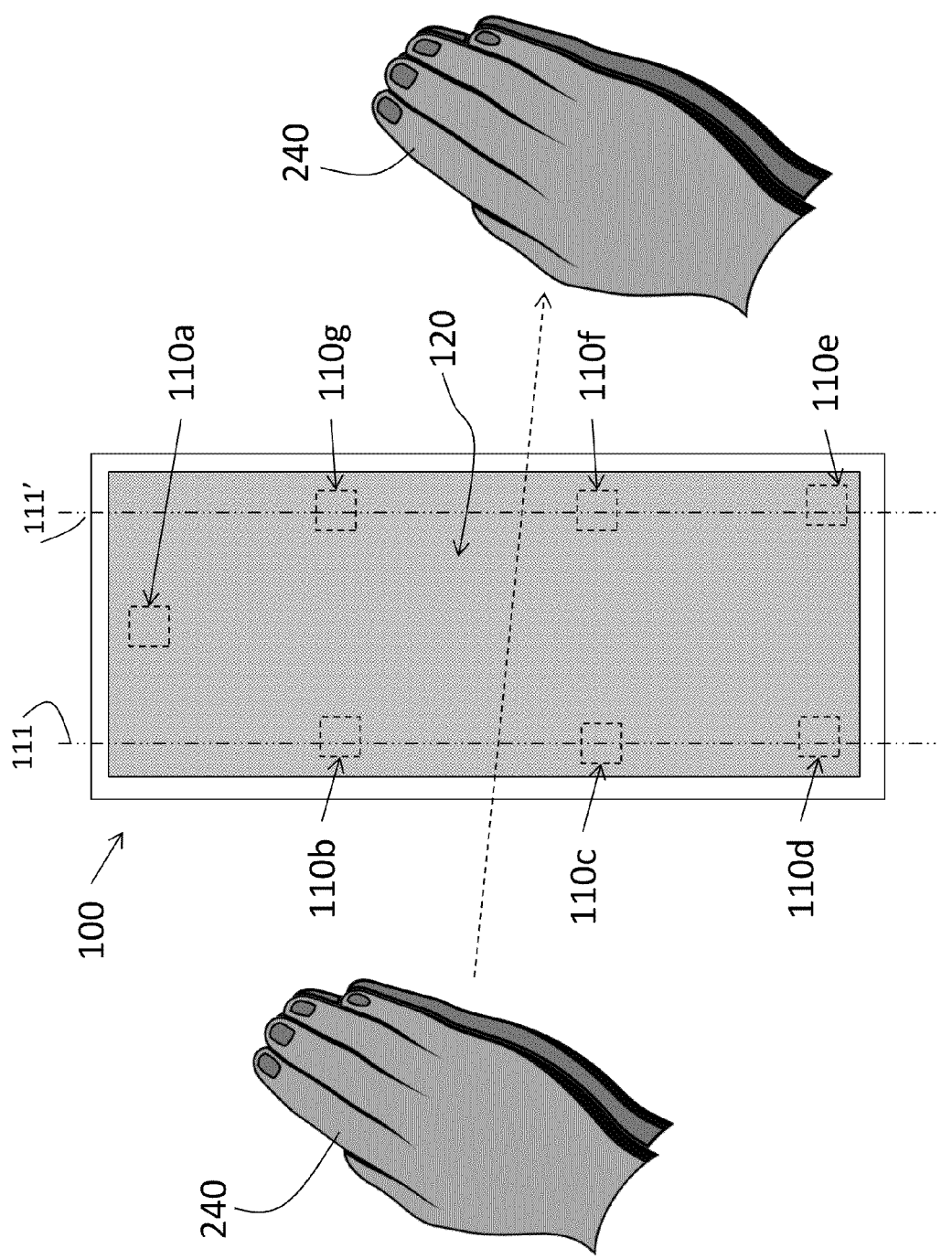
FIG. 3 shows a device including an exemplary arrangement of ambient light sensors according to another embodiment.

FIG. 3 shows a device 100 including an exemplary arrangement of ambient light sensors 110 according to another embodiment. The exemplary device 100 shown in FIG. 3 is similar to the device 100 shown in FIGS. 1 and 2 in that the screen 120 occupies most of one surface of the device 100. The device 100 shown in FIG. 3 includes seven ALSs 110$a$, 110$b$, 110$c$, 110$d$, 110$e$, 110$f$, 110$g$ arranged around the perimeter of the screen 120. As shown in FIG. 3, ALS 110$a$ is offset from a common axial line 111 of ALSs 110$b$, 110$c$, and 110$d$ and also a common axial line 111' of ALSs 110$e$, 110$f$, and 110$g$. In alternate embodiments, one or more of the ALSs 110$b$, 110$c$, and 110$d$ or the ALSs 110$e$, 110$f$, and 110$g$ may be disposed such that they are not linearly aligned with other ALSs 110 along 111 or 111', respectively. For example, both ALS 110$c$ and ALS 110$f$ may be disposed closer to the center of the screen 120 and, thus, offset from the axial line 111 common to ALSs 110$b$ and 110$d$ and the axial line 111' common to ALSs 110e and 110g, respectively. Increasing the number of ALSs 110 increases the number of gestures that may be detected by the device 100. For example, one waving gesture (movement of the object 240 from one side of the device 100 to the other) is illustrated by FIG. 3. Because of the number of ALSs 110 around the perimeter of the screen 120, other waving gestures, distinguishable from the waving gesture shown in FIG. 3, are also possible. The object 240 may move from ALSs 110d and 110e to ALS 110a, for example, or from ALS 110d to ALS 110g. It bears noting that, if the ALSs 110 were clustered closer together and the object 240 is a hand, as shown in FIG. 3, fewer distinguishable gestures are possible than when the ALSs 110 are disposed, as shown.

Figure 4:
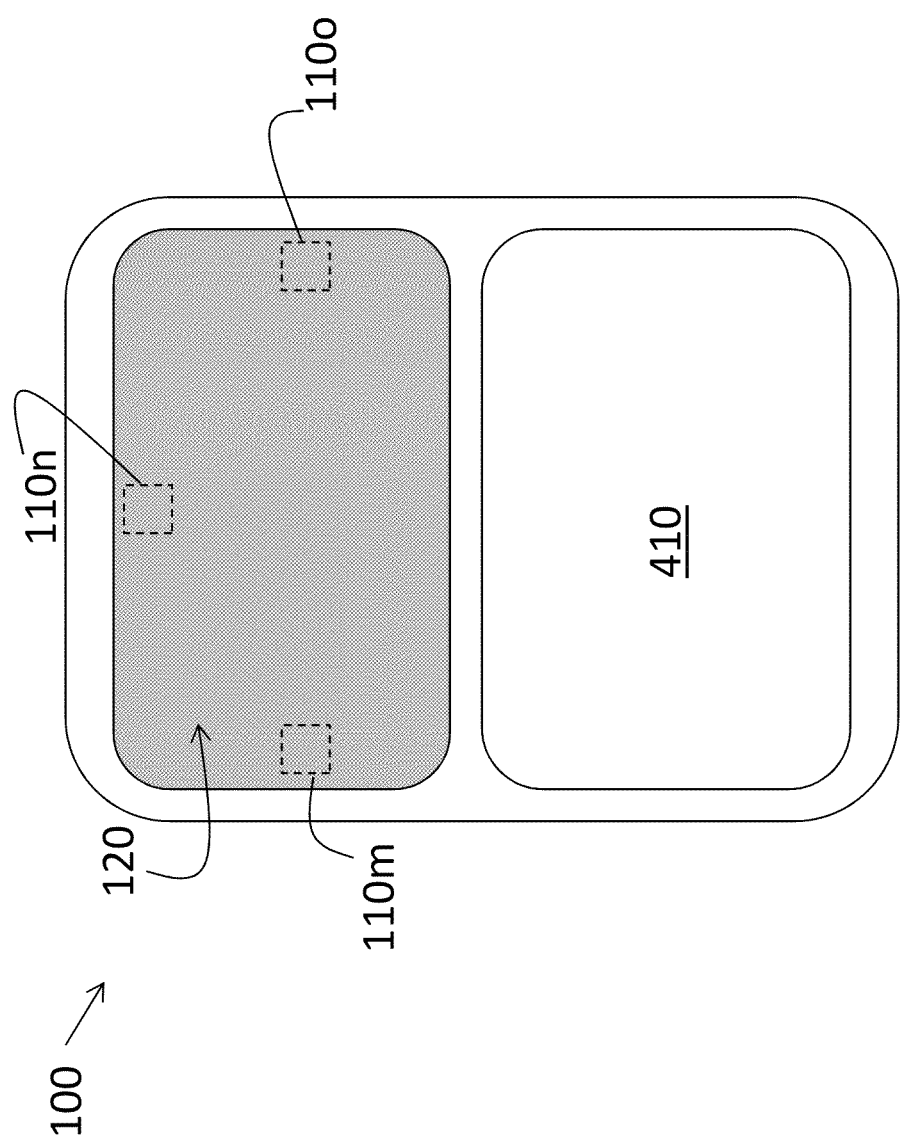
FIG. 4 shows a device including an exemplary arrangement of ambient light sensors according to yet another embodiment.

FIG. 4 shows a device 100 including an exemplary arrangement of ambient light sensors 110 according to yet another embodiment. Unlike the exemplary devices 100 shown in FIGS. 1-3, the device 100 shown in FIG. 4 includes a keyboard or other component in the space 410 such that the screen 120 occupies less of one surface of the device 100 relative to the screen 120 shown in FIGS. 1-3. Three ALSs 110m, 110n, 110o are shown near the perimeter of the screen 120. As noted above and shown in FIG. 1, the ALSs 110m, 110n, 110o may be disposed closer together so that the gestures made by the object 240 are more analogous to gestures a user of a touchpad may make with a finger.

Figure 5:
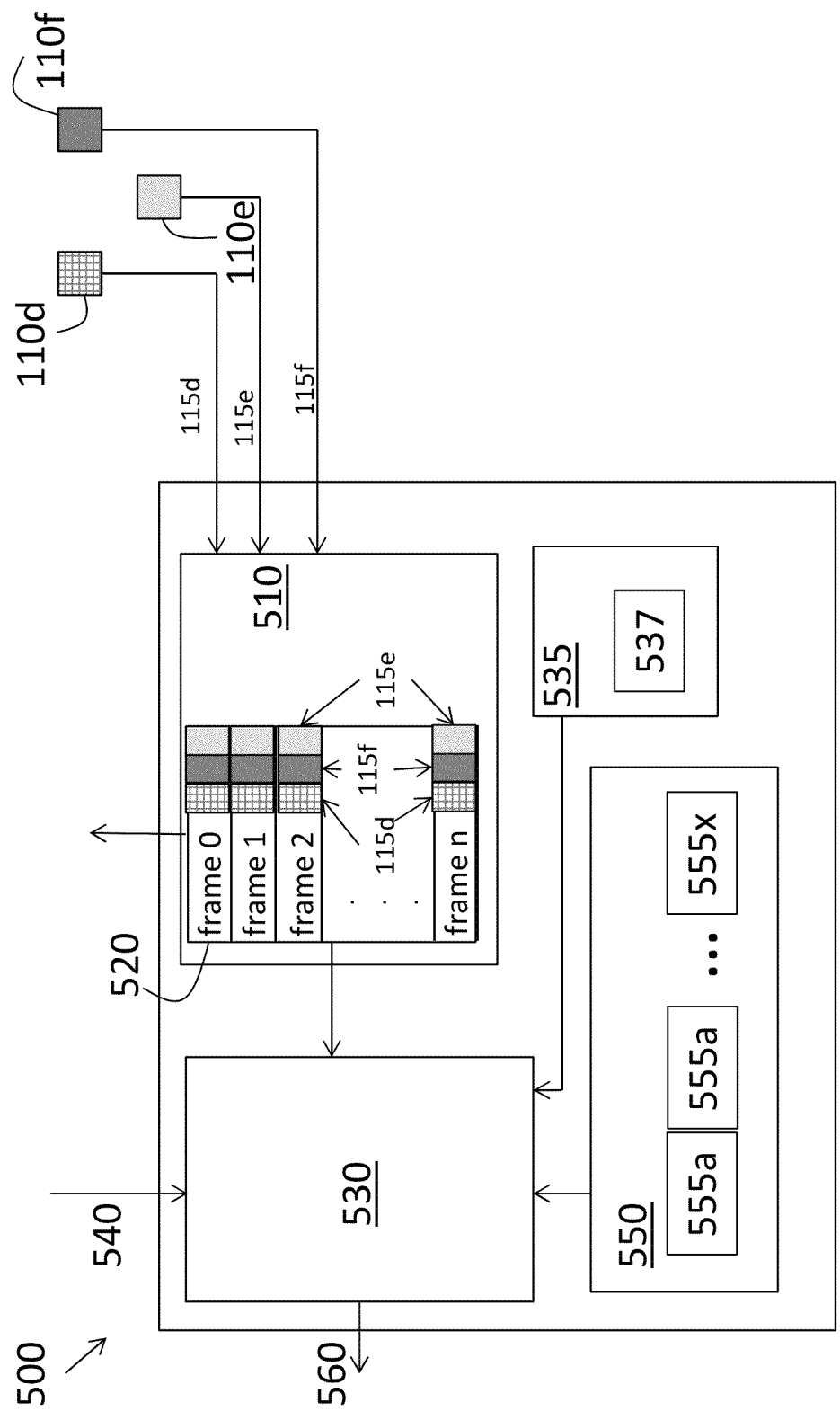
FIG. 5 is a block diagram of a system to process gestures.

FIG. 5 is a block diagram of a system 500 to process gestures. Functions performed by the system 500 are discussed below with reference to specific components. However, in alternate embodiments, the system 500 may process gestures using one or more processors and one or more memory devices that serve more than one of the functions discussed herein. In addition, the same processors and memory devices that process gestures as discussed below may perform other functions within the device 100. For example, the processor to identify gestures may be one of several digital signal processors (DSPs 801, FIG. 8) generally available in a smart phone or tablet.

An input to the system 500 is the light intensity 115 measured from each of the ALSs 110. The measurements are received by a data collection engine 510, which includes both memory and processor functionalities. As the light intensity 115 measurement data is received from each of the ALSs 110, the data collection engine 510 outputs a frame of data 520 for each time instant. That is, each frame of data 520 includes the light intensity 115 measurement for every ALS 110 at a given time instant. While each frame of data 520 may generally be discussed as including the light intensity 115 measurement for each ALS 110 at an instant of time, the ALSs 110 may instead sample light intensity 115 in turn (rather than simultaneously) such that a frame of data 520 includes light intensity 115 measurements for a period of time for one cycle of the ALSs 110. A processor functioning as a gesture identifier 530 receives each frame of data 520. The gesture identifier 530 may operate according to one of several embodiments as discussed below.

In order to identify a movement of the object 240 as a particular (known) gesture, the gesture identifier 530 uses a comparison of light intensity 115 measurements of the ALSs 110, as discussed below, along with a comparison with a gesture template 537 stored in a template memory device 535. A dynamically adjusted minimum change in light intensity 115 may be set based on expected noise and errors. That is, a threshold percentage of change in detected light intensity 115 may be required before it is interpreted as a true variation in ambient light. Based on the light intensity 115 measurements among the ALSs 110 within a frame of data 520 (for a single time instant or measurement cycle), the gesture identifier 530 may ascertain a position of the object 240. For example, for a given frame of data 520, if the light intensity 115 measurements of ALSs 110d and 110f are higher (by a defined threshold) than the light intensity 115 measurement output by ALS 110e, then the object 240 may be determined to be over the ALS 110e and, thereby, blocking some of the light from the light source 210. Based on the light intensity 115 measurements among two or more frames of data 520 (two or more time instants or measurement cycles), the gesture identifier 530 may ascertain characteristics of the (movement) gesture such as a direction of the movement, speed of the movement, and whether the movement is accelerating or decelerating. For example, if the light intensity 115 measurements of ALSs 110d and 110f are higher (by a defined threshold) than the light intensity 115 measurement output by ALS 110e in one frame of data 520 and the light intensity 115 measurement of ALS 110e is higher (by a defined threshold) than the light intensity 115 measurements output by ALSs 110d and 110f in the next frame of data 520, the gesture identifier 530 may ascertain that the object 240 moved from a direction of the ALS 110e toward a direction of the ALSs 110d and 110f. If the change in light intensity 115 measurements occurred over several frames of data 520, then the movement of the object 240 may be ascertained as being relatively slower than if the change occurred over the course of one frame of data 240. Based on the ascertained characteristics of the gesture, the gesture identifier 530 may identify the gesture among a set of known gestures based on the gesture template 537.

The gesture template 537 facilitates the association of a movement of the object 240 discerned by the gesture identifier 530 with a particular known gesture. The gesture template 537 may be regarded as a sample of ideal light intensity 115 measurement data corresponding with each known gesture. More specifically, the gesture template 537 may be regarded as providing the ideal relative light intensity 115 among the ALSs 110 or frames of data 520 or both for a given known gesture. Thus, by comparing the input light intensity 115 measurements (in the frames of data 520) or comparisons of light intensity measurements 115 with the ideal measurements in the gesture template 537, the gesture identifier 530 identifies the object 240 movement as a known gesture. This identification of the gesture may be done by a process of elimination of the known gestures in the gesture template 537. Thus, the gesture identifier 530 may identify the gesture using the gesture template 537, through a process of elimination of available known gestures, before the object 240 movement is complete. In this case, the gesture identifier 530 may continue to process frames of data 520 to verify the detected gesture or, in alternate embodiments, the gesture identifier 530 may stop processing additional frames of data 520 after identifying the gesture and wait for a trigger signal 540 discussed below. Each of the ALSs 110 may be programmable to provide 10, 20, 50, 10, 125, 15, 200 and 250 samples of light intensity 115 (frames of data 520) a second. The ALS 110 scanning rate is a factor in determining the speed at which a gesture may be made in order to be recognized. That is, when the ALSs 110 are sampling at a rate of 10 light intensity 115 samples per second, the fastest identifiable gesture is much slower than the fastest identifiable gesture that may be made when the ALSs 110 are sampling at a rate of 250 light intensity 115 samples per second. The ALSs 115 sampling at a rate of 10 frames of data 520 per second (10 light intensity 115 samples per second each) may translate to an object 240 travelling 10 cm in 1.5 seconds in order to be recognized and processed properly. The system 610 (FIG. 6) may dynamically calculate and adjust the scanning rate of the ALSs 110.

Another input to the gesture identifier 530 is one of the gesture libraries 555 stored in a gesture library storage 550. Each gesture library 555 is associated with an application, and the gesture identifier 530 selects the gesture library 555 associated with the application currently being executed by the device 100. A given gesture library 555 associated with a given application may not include every known gesture in the gesture template 537. Thus, based on the application currently being executed by the device 100, the gesture identifier 530 may narrow down the set of known gestures within the gesture template 537 to compare against the frames of data 520 output by the data collection engine 510 in order to identify the gesture. A gesture library 555 indicates an action output 560 corresponding with a set of gestures. Thus, when the gesture identifier 530 identifies a known gesture based on the movement of the object 240 and the gesture template 537, and the gesture identifier 530 finds that known gesture among the set of gestures in a gesture library 555 associated with the application currently being run by the device 100, then the gesture identifier 530 outputs the corresponding action output 560 stemming from the object 240 movement. The action output 560 of the gesture identifier 530 acts as a command to the application being executed. For example, when the application being executed is a document editing session, the gestures identified by the gesture identifier 530 may correspond with action outputs 560 such as "next page" (wave down), "previous page" (wave up), "zoom in" (bringing fingers together), and "zoom out" (spreading fingers apart). If the device 100 is currently not executing any application or if the application currently being executed by the device 100 does not have a gesture library 555 associated with it, then, even if the gesture identifier 530 uses the gesture template 537 to identify a known gesture based on the movement of the object 240, no action is taken by the gesture identifier 530 based on identifying the gesture. That is, there is no action output 560 corresponding with the identified gesture, because there is no gesture library 555 to look up.

According to one embodiment, the gesture identifier 530 may not use the gesture template 537 to identify a gesture when no application is being executed by the device 100 or when an application without an associated gesture library 555 is being executed by the device 100. According to another embodiment, the gesture identifier 530 may not begin to process any frames of data 520 before receiving a trigger signal 540. The trigger signal 540 is detailed below with reference to FIG. 6. According to another embodiment, the gesture identifier 530 may process an initial set of frames of data 520 and then not process another set of frames of data 520 needed to identify the gesture until the trigger signal 540 is received. For example, the gesture identifier 530 may process a particular number of frames of data 520 or a number of frames of data 520 representing a particular length of time (number of time instants) and then stop processing further frames of data 520 until the trigger signal 540 is received. According to yet another embodiment, the gesture identifier 530 may continually process frames of data 520 as they are output from the data collection engine 510.

Regardless of the behavior of the gesture identifier 530 based on the trigger signal 540, the lack of an associated gesture library 555, or the lack of an application being executed at all, the data collection engine 510 still outputs the frames of data 520. This is because the light intensity 115 measurements may be used for background functions such as adjustment of the screen 120 backlighting, for example, based on the detected ambient light, even if gesture detection is not to be performed. Some of these background functions are detailed below with reference to FIG. 6.

Figure 6:
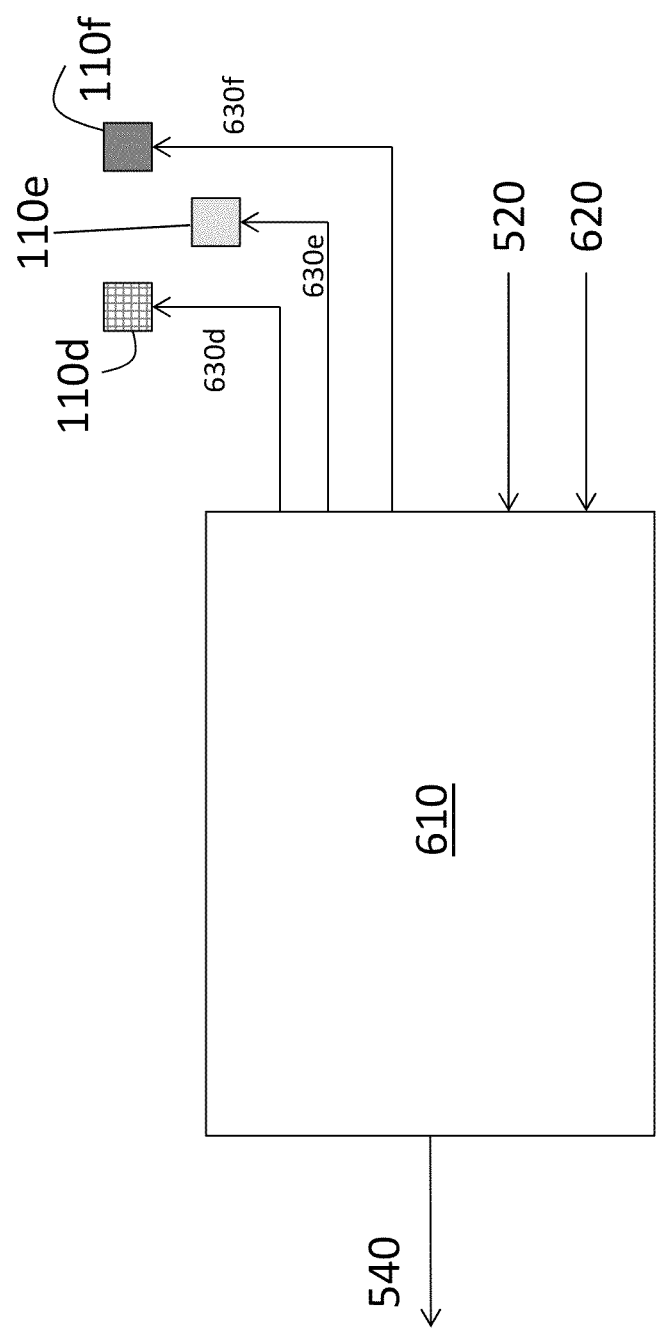
FIG. 6 is a block diagram of a system to control the two or more ambient light sensors.

FIG. 6 is a block diagram of a system 610 to control the two or more ambient light sensors 110. As noted with reference to FIG. 5, the functions described for the system 610 may be performed by one or more processors and one or more memory devices, which may also perform other functions within the device 100. The system 610 may be regarded as a background processing system, because it may operate continuously to dynamically control the ALSs 110. The system 610 receives the light intensity 115 measurements output by the ALSs 110 to the data collection engine 510 as frames of data 520. In alternate embodiments, the ALSs 110 may directly output light intensity 115 measurements to the system 610 as well as to the data collection engine 510. The system 610 may also receive additional information 620. This additional information 620 may indicate, for example, whether the device 100 is currently executing an application and, if so, which application the device 100 is currently executing.

Based on the light intensity 115 measurements (directly or in the form of frames of data 520) and the additional information 620, the system 610 adjusts the sensitivity or wavelength band or range or both for each ALS 110. For example, based on the available light (measured ambient light intensity 115), the system 610 may change the wavelength range for the ALSs 110 via a control signal 630 from the system 610 to one or more of the ALSs 110. The change (adjustment of wavelength range) may ensure that the ALSs 110 are focused in the correct wavelength (frequency) band for the current conditions. As another example, based on a change in available light (e.g., based on switching a light on or off), the system 610 may change the sensitivity of the ALSs 110. Any order of switching lights produces a new range of change in light intensity 115 to which the ALSs 110 must adapt. For example, the range of change of light intensity 115 to which the ALSs 110 are sensitive may be 50-250 lux. In a darker environment (e.g., a conference room during a presentation) the range of change of light intensity 115 to which the ALSs 110 are sensitive may be 2-15 lux. The adjustment of the ALSs 110 through the control signal 630 may be done continuously, periodically, or based on a trigger event such as, for example, a change in the application being executed by the device 100. For example, sensitivity adjustment may be done automatically once for every 5 frames of data 520. The system 610 may also adjust the order and frequency of light intensity 115 measurements by the ALSs 110. For example, based on additional information 620 indicating that a particular application is being executed by the device 100, the system 610 may send control signals 630 to have the ALSs 110 collect light intensity 115 samples for each cycle (frame of data 520) in a particular order and with a particular frequency.

In addition to controlling the ALSs 110, the system 610 may provide the trigger signal 540 to the gesture identifier 530 (see FIG. 5). Because the system 610 monitors the light intensity 115 measurements in the frames of data 520 to fulfill the background functions described above, the system 610 may additionally identify trigger events that signal when gesture processing should be initiated by the gesture identifier 530 and output the trigger signal 540 accordingly. For example, the system 610 may output a trigger signal 540 to the gesture identifier 530 when it receives a frame of data 520 that indicates a change in light intensity 115 measured by one or more ALSs 110. The change in light intensity 115 measurement may indicate a start of a movement of an object 240 and, thus, the start of a gesture. In various embodiments, the change in measured light intensity 115 may be 10%+/−3% or higher before the system 610 outputs a trigger signal 540. In an embodiment, the change in measured light intensity 115 may be 20%+/−5% or higher before the system 610 outputs a trigger signal 540. In an embodiment, the change in measured light intensity may be 25%+/−5% or higher before the system 610 outputs a trigger signal 540.

Figure 7:
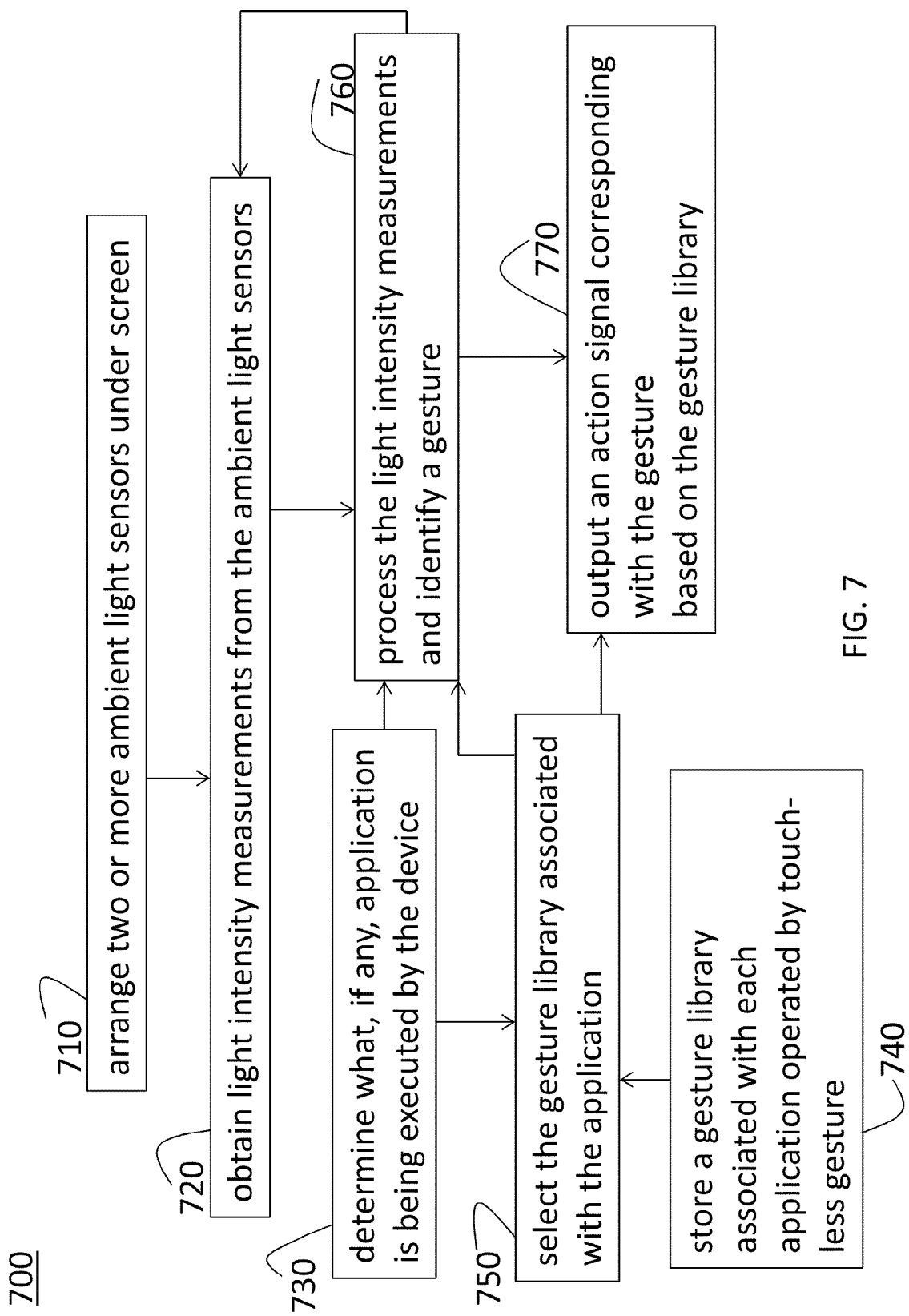
FIG. 7 shows the process flow of a method of detecting a gesture.

FIG. 7 shows the process flow of a method 700 of detecting a gesture according to embodiments discussed above. At block 710, arranging two or more ALSs 110 under the screen 120 of a device 100 may be according to the embodiments shown in FIGS. 1, 3, and 4 or in alternate arrangements according to the guidelines discussed above. Obtaining light intensity 115 measurements from the ALSs 110 (block 720) may be in photometric or radiometric units as discussed above. Obtaining (receiving) the light intensity 115 measurements may also include dynamically controlling the ALSs 110 with the system 610 to modify the wavelength range or spectral sensitivity of each ALS 110, for example. As discussed with reference to FIG. 6, the control by the system 610 may be based on light intensity 115 measurements by the ALSs 110, for example. Determining what, if any, application is being executed by the device 100, at block 730, may be done by the gesture identifier 530 and may be part of the additional information 620 provided to the system 610. At block 740, the process includes storing a gesture library 555 associated with each application that may be operated using touch-less gestures in the gesture library storage 550. Selecting the gesture library 555 associated with the application being executed by the device 100 may be done by the gesture identifier 530 at block 750. Block 750 may also include the gesture identifier 530 determining that no gesture library 555 is applicable because the device 100 is not executing any application or is executing an application without an associated gesture library 555. At block 760, processing the light intensity 115 measurements and identifying a gesture involves the data collection engine 510 outputting the frames of data 520 and the gesture identifier 530 using a comparison of light intensity 115 measurements in addition to the gesture template 537. Block 760 may also include the system 610 sending a trigger signal 540 to the gesture identifier 530 to begin or continue the gesture processing. Block 760 may further include the gesture identifier 530 not identifying the gesture at all based on not having a gesture library 555 available. At block 770, outputting an action signal 560 corresponding with the gesture based on the gesture library 555 is done by the gesture identifier 530 as detailed above.

Figure 8:
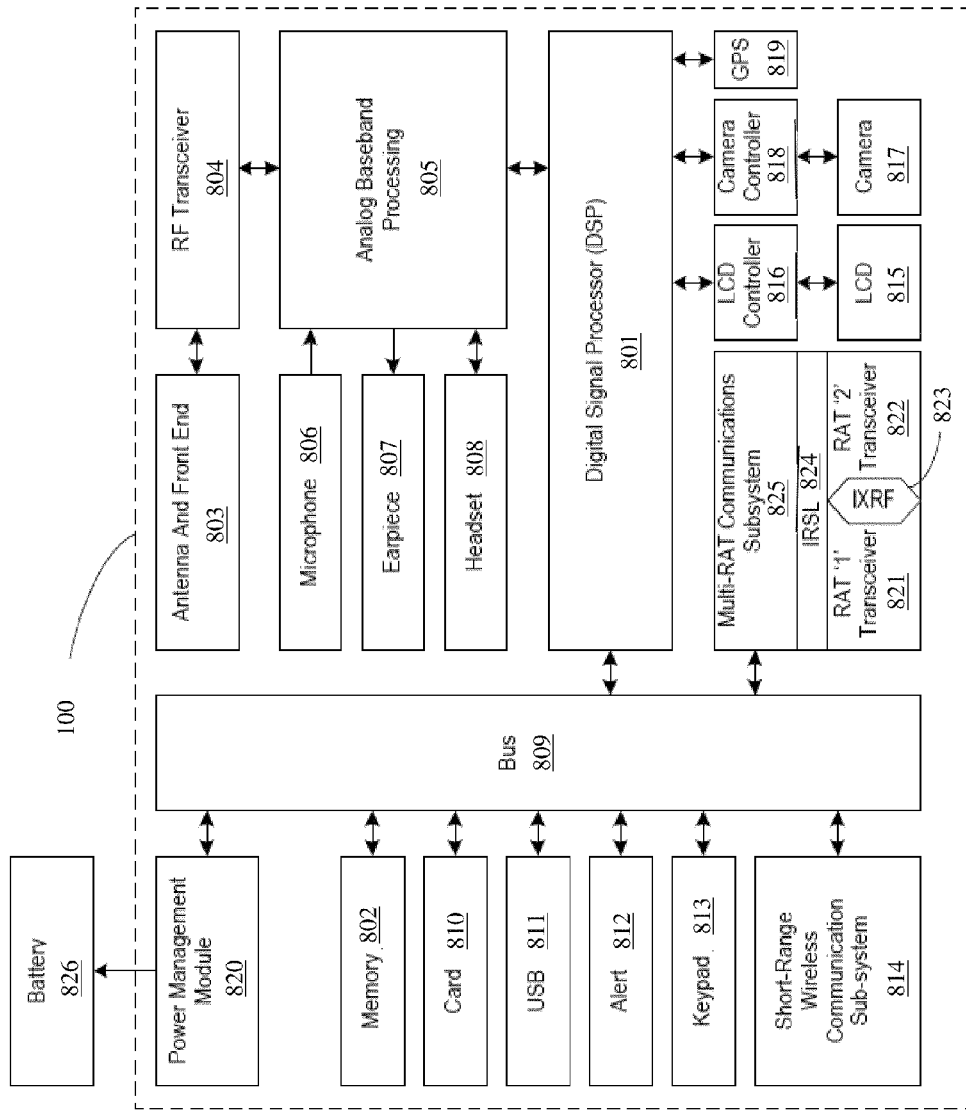
FIG. 8 is a block diagram of an exemplary device that facilitates touch-less gesture detection as described herein.

FIG. 8 is a block diagram of an exemplary device 100 that facilitates touch-less gesture detection as described in embodiments above. While various components of the device 100 are depicted, alternate embodiments of the device 100 may include a subset of the components shown or include additional components not shown in FIG. 8. The device 100 includes a DSP 801 and a memory 802. The DSP 801 and memory 802 may provide, in part or in whole, the functionality of the system 500 (FIG. 5). As shown, the device 100 may further include an antenna and front-end unit 803, a radio frequency (RF) transceiver 804, an analog baseband processing unit 805, a microphone 806, an earpiece speaker 807, a headset port 808, a bus 809, such as a system bus or an input/output (I/O) interface bus, a removable memory card 810, a universal serial bus (USB) port 811, an alert 812, a keypad 813, a short range wireless communication sub-system 814, a liquid crystal display (LCD) 815, which may include a touch sensitive surface, an LCD controller 816, a charge-coupled device (CCD) camera 817, a camera controller 818, and a global positioning system (GPS) sensor 819, and a power management module 820 operably coupled to a power storage unit, such as a battery 826. In various embodiments, the device 100 may include another kind of display that does not provide a touch sensitive screen. In one embodiment, the DSP 801 communicates directly with the memory 802 without passing through the input/output interface ("Bus") 809.

In various embodiments, the DSP 801 or some other form of controller or central processing unit (CPU) operates to control the various components of the device 100 in accordance with embedded software or firmware stored in memory 802 or stored in memory contained within the DSP 801 itself. In addition to the embedded software or firmware, the DSP 801 may execute other applications stored in the memory 802 or made available via information media such as portable data storage media like the removable memory card 810 or via wired or wireless network communications. The application software may comprise a compiled set of machine-readable instructions that configure the DSP 801 to provide the desired functionality, or the application software may be high-level software instructions to be processed by an interpreter or compiler to indirectly configure the DSP 801.

The antenna and front-end unit 803 may be provided to convert between wireless signals and electrical signals, enabling the device 100 to send and receive information from a cellular network or some other available wireless communications network or from a peer device 100. In an embodiment, the antenna and front-end unit 803 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 803 may include antenna tuning or impedance matching components, RF power amplifiers, or low noise amplifiers.

In various embodiments, the RF transceiver 804 facilitates frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 805 or the DSP 801 or other central processing unit. In some embodiments, the RF Transceiver 804, portions of the antenna and front-end unit 803, and the analog base band processing unit 805 may be combined in one or more processing units and/or application specific integrated circuits (ASICs).

Note that, in this diagram, the radio access technology (RAT) RAT1 and RAT2 transceivers 821, 822, the IXRF 823, the IRSL 824 and Multi-RAT subsystem 825 are operably coupled to the RF transceiver 804 and analog baseband processing unit 805 and then also coupled to the antenna and front-end unit 803 via the RF transceiver 804. As there may be multiple RAT transceivers, there will typically be multiple antennas or front ends 803 or RF transceivers 804, one for each RAT or band of operation.

The analog baseband processing unit 805 may provide various analog processing of inputs and outputs for the RF transceivers 804 and the speech interfaces (806, 807, 808). For example, the analog baseband processing unit 805 receives inputs from the microphone 806 and the headset 808 and provides outputs to the earpiece 807 and the headset 808.

To that end, the analog baseband processing unit 805 may have ports for connecting to the built-in microphone 806 and the earpiece speaker 807 that enable the device 100 to be used as a cell phone. The analog baseband processing unit 805 may further include a port for connecting to a headset or other hands-free microphone and speaker configuration. The analog baseband processing unit 805 may provide digital-to-analog conversion in one signal direction and analog-to-digital conversion in the opposing signal direction. In various embodiments, at least some of the functionality of the analog baseband processing unit 805 may be provided by digital processing components, for example by the DSP 801 or by other central processing units.

The DSP 801 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 801 may perform modulation, coding, interleaving, and spreading, and for a receiver function the DSP 801 may perform despreading, deinterleaving, decoding, and demodulation. In another embodiment, for example in an orthogonal frequency division multiplex access (OFDMA) technology application, for the transmitter function the DSP 801 may perform modulation, coding, interleaving, inverse fast Fourier transforming, and cyclic prefix appending, and for a receiver function the DSP 801 may perform cyclic prefix removal, fast Fourier transforming, deinterleaving, decoding, and demodulation. In other wireless technology applications, yet other signal processing functions and combinations of signal processing functions may be performed by the DSP 801.

The DSP 801 may communicate with a wireless network via the analog baseband processing unit 805. In some embodiments, the communication may provide Internet connectivity, enabling a user to gain access to content on the Internet and to send and receive e-mail or text messages. The input/output interface ("Bus") 809 interconnects the DSP 801 and various memories and interfaces. The memory 802 and the removable memory card 810 may provide software and data to configure the operation of the DSP 801. Among the interfaces may be the USB interface 811 and the short range wireless communication sub-system 814. The USB interface 811 may be used to charge the device 100 and may also enable the device 100 to function as a peripheral device to exchange information with a personal computer or other computer system. The short range wireless communication sub-system 814 may include an infrared port, a Bluetooth interface, an IEEE 802.11 compliant wireless interface, or any other short range wireless communication sub-system, which may enable the device to communicate wirelessly with other nearby client nodes and access nodes. The short-range wireless communication sub-system 814 may also include suitable RF Transceiver, Antenna and Front End subsystems.

The input/output interface ("Bus") 809 may further connect the DSP 801 to the alert 812 that, when triggered, causes the device 100 to provide a notice to the user, for example, by ringing, playing a melody, or vibrating. The alert 812 may serve as a mechanism for alerting the user to any of various events such as an incoming call, a new text message, and an appointment reminder by silently vibrating, or by playing a specific pre-assigned melody for a particular caller.

The keypad 813 couples to the DSP 801 via the I/O interface ("Bus") 809 to provide one mechanism for the user to make selections, enter information, and otherwise provide input to the device 100. The keypad 813 may be a full or reduced alphanumeric keyboard such as QWERTY, DVORAK, AZERTY and sequential types, or a traditional numeric keypad with alphabet letters associated with a telephone keypad. The input keys may likewise include a track wheel, track pad, an exit or escape key, a trackball, and other navigational or functional keys, which may be inwardly depressed to provide further input function. Another input mechanism may be the LCD 815, which may include touch screen capability and also display text and/or graphics to the user. The LCD controller 816 couples the DSP 801 to the LCD 815.

The CCD camera 817, if equipped, enables the device 100 to make digital pictures. The DSP 801 communicates with the CCD camera 817 via the camera controller 818. In another embodiment, a camera operating according to a technology other than Charge Coupled Device cameras may be employed. The GPS sensor 819 is coupled to the DSP 801 to decode global positioning system signals or other navigational signals, thereby enabling the device 100 to determine its position. The GPS sensor 819 may be coupled to an antenna and front end (not shown) suitable for its band of operation. Various other peripherals may also be included to provide additional functions, such as radio and television reception.

In various embodiments, device 100 comprises a first Radio Access Technology (RAT) transceiver 821 and a second RAT transceiver 822. As shown in FIG. 16, and described in greater detail herein, the RAT transceivers '1' 821 and '2' 822 are in turn coupled to a multi-RAT communications subsystem 825 by an Inter-RAT Supervisory Layer Module 824. In turn, the multi-RAT communications subsystem 825 is operably coupled to the Bus 809. Optionally, the respective radio protocol layers of the first Radio Access Technology (RAT) transceiver 821 and the second RAT transceiver 822 are operably coupled to one another through an Inter-RAT eXchange Function (IRXF) Module 823.

A specific embodiment of a gesture library 555 is one that includes one or more passwords that unlock device 100 functionality. Unlike most gesture libraries 555 that include gestures associated with respective applications, the one or more gestures recognized as authorized passwords are generated by the user. That is, while commercially available applications may typically come with associated gesture libraries 555, the gesture library 555 associated with password entry is user-defined through a password definition application. The components and processes involved in password definition and use according to various embodiments are detailed below.

Figure 9:
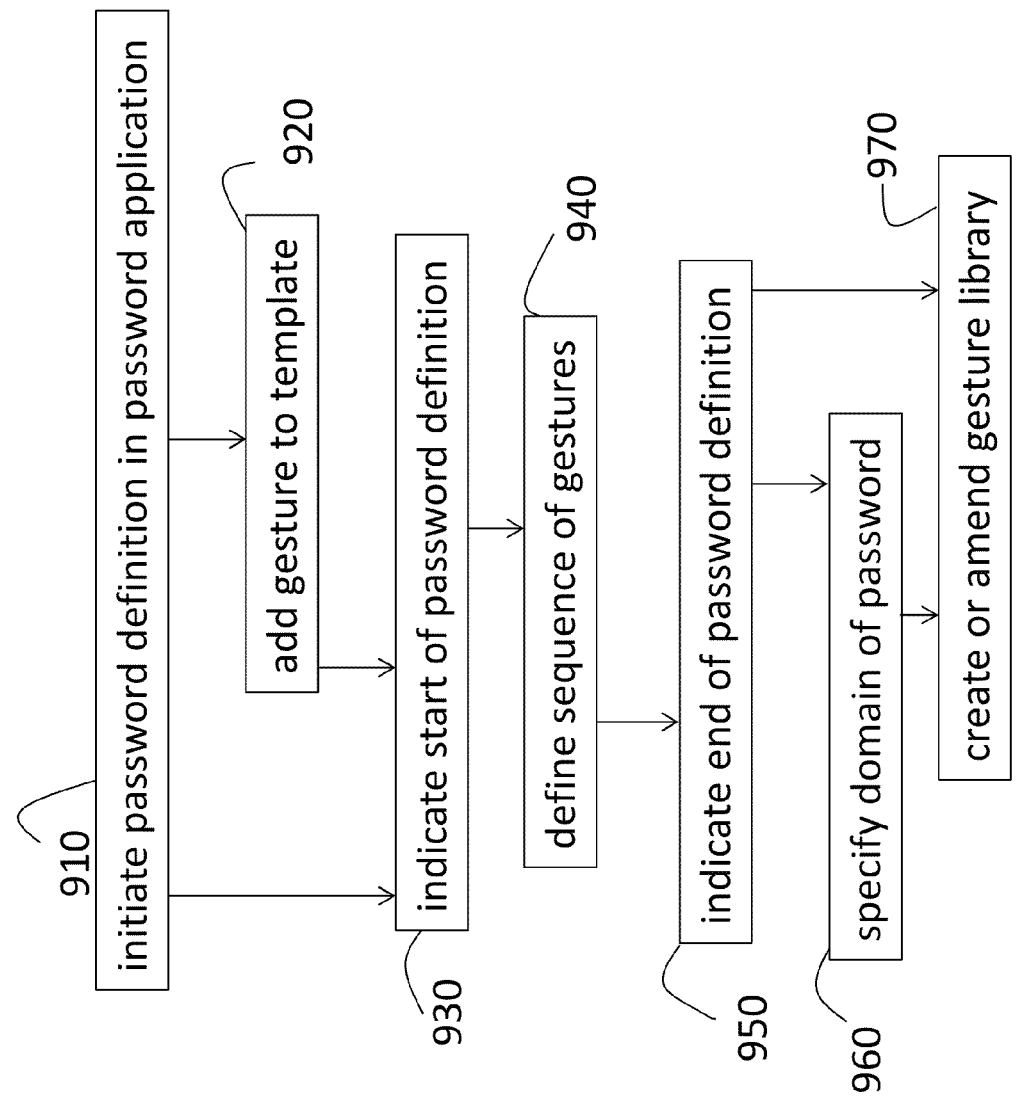
FIG. 9 is a process flow of a method to define one or more passwords according to an embodiment.

FIG. 9 is a process flow of a method to define one or more passwords according to an embodiment. At block 910, initiating password definition in a password application includes initiating the password application executed by one or more of the processors of the device 100 (e.g., DSP 801). Initiating the password definition may be done through a conventional input such as a touch-screen of the device 100 or mouse-based selection, for example. Initiating the password definition at block 910 may also be done by a touch-less gesture to select among available applications. According to one embodiment, the password application may first facilitate adding a gesture to the gesture template 537 at block 920. Thus, if the gesture-based password the user wishes to define includes a gesture that is not already in the gesture template 537 and, therefore, is a gesture not recognized with the system 500, then the user may add the gesture to the gesture template 537. At block 930, indicating a start of the password definition process indicates the start of a sequence of gestures 1001 (see e.g., FIG. 10) to be input by the user as the password. Gestures recognized by the gesture identifier 530 after the indication are regarded as part of the sequence of gestures 1001. Thus, defining the sequence of gestures 1001 at block 940 includes the user performing the sequence of gestures 1001 with an object 240 in touch-less communication with the device 100. At block 950, indicating the end of the password definition process indicates the end of the sequence of gestures 1001. Both the indications of the start and end of the password definition may be done by a gesture or via another input, such as a selection of a key or touch-screen entry, for example.

The sequence of gestures 1001 defined as the password at block 940 may include one or more gestures that have permitted variations. For example, the user may define a password as a sequence of gestures 1001 with five gestures (A, B, C, D, and E) and then define two or more gestures for the fourth gesture (D) in the sequence of gestures 1001 or define the fourth gesture (D) as any entered gesture. This variation in the way that the fourth gesture (D) may be entered by the user may confuse someone watching the password entry to learn the sequence of gestures 1001, because the authorized user would not enter the password using the same gestures as the sequence of gestures 1001 every time. Instead, the user might change the fourth gesture (D) in the sequence of gesture 1001 each time he or she were in a public place. Once a password is defined (blocks 930-950), the password may be made specific to a domain (hub) of the device 100. Specifying a domain of the password at block 960 means that entering the password (sequence of gestures 1001) unlocks only the features related to the specified domain. A device 100 may include multiple domains such as a work domain and a personal domain, for example. Embodiments of a work domain (enterprise) and a personal domain are discussed in U.S. patent application Ser. Nos. 13/529,509 and 12/869,635, which are hereby incorporated by reference for any purpose; however, if the disclosures of U.S. patent application Ser. Nos. 13/529,509 and 12/869,635 conflict with the present application, the present application is the correct interpretation. Each of the specified domains may have one or more applications and settings of the device 100 associated with them. That is, unlocking a domain with a domain-specific password may unlock one or more applications or initiate one or more settings for the device 100. Specifying the domain may be done in the password application. The application may be run by one or more of the processors of the device 100 discussed above. Once defined, at block 970, creating or amending the gesture library 555 associated with the password application includes storing the password (sequence of gestures 1001) and any domain specific information in the gesture library 555 associated with the password application and overwriting or deleting previous password information (if it existed) relating to the same functionality.

Figure 10:
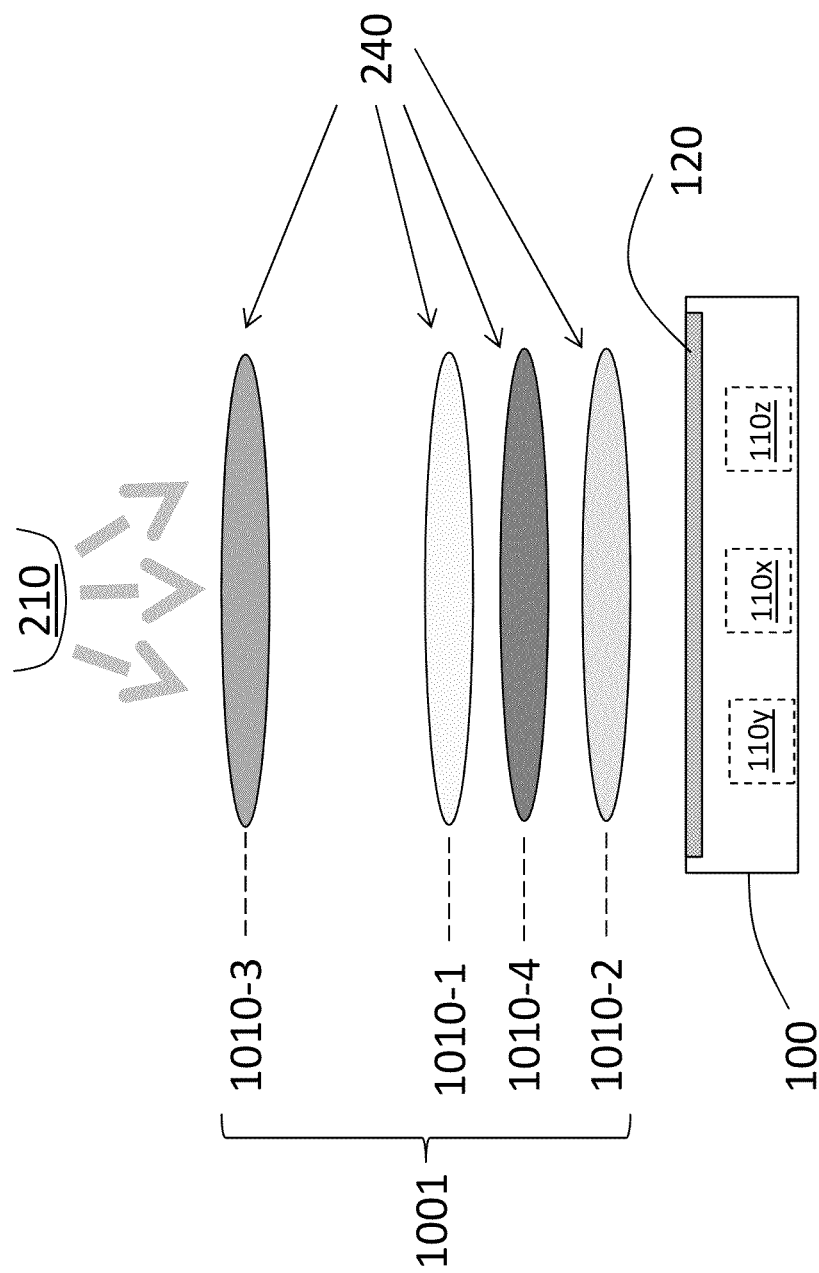
FIG. 10 illustrates an exemplary sequence of gestures defining a password.

FIG. 10 illustrates an exemplary sequence of gestures 1001 defining a password. FIG. 10 shows a device 100 with three ALSs 110 disposed beneath the screen 120, in a similar arrangement to FIGS. 1 and 2. Four different time instants are shown by FIG. 10, with the object 240 at four different positions 1010-1, 1010-2, 1010-3, 1010-4. These four positions 1010-1, 1010-2, 1010-3, 1010-4 correspond with four gestures that make up the sequence of gestures 1001 that define a password. The object 240 positions 1010 (sequence of gestures 1001) would be the same whether the password were being defined (as discussed with reference to FIG. 9) or the password were being entered to unlock functionality (as discussed below with reference to FIG. 11).

The closer the object 240 is to the ALSs 110, the more light the object 240 blocks from the light source 210 to the ALSs 110. Thus, the closer the object 240 is to the ALSs 110, the lower the light intensity 115 measured by the ALSs 110. As a result, the light intensity 115 measured by each of the ALSs 110 at a first position 1010-1 of the object 240 is more than the light intensity 115 measured by each of the ALSs 110 at a second position 1010-2 of the object 240 (closest to the ALSs 110), which is also less than the light intensity 115 measured by the ALSs 110 at a third position 1010-3 of the object 240 (farthest from the ALSs 110). The fourth position 1010-4 of the object 240, as shown in FIG. 10, is between the first position 1010-1 and the second position 1010-2 of the object 240. As a result, the light intensity 115 measured by the ALSs 110 at the fourth position 1010-4 is a value between the values of light intensity 115 measured at the first and third positions 1010-1 and 1010-3. Assuming that the ALSs 110 measure light intensity 115 in luminosity and assuming a tolerance of +/−2 lux based on the object 240 (e.g., hand) not being perfectly still during the recognition of each gesture, the light intensity 115 values measured by each of the ALSs 110 at each of the positions 1010 may be as shown in Table 1.

TABLE 1

| object position | light intensity 115 measured |
|---|---|
| 1010-1 | 22 (+/−2) lux |
| 1010-2 | 4 (+/−2) lux |
| 1010-3 | 80 (+/−2) lux |
| 1010-4 | 15 (+/−2) lux |

Based on the application being executed, the gesture identifier 530 outputs a different action output 560 upon identifying the series of gestures 1001 show in Table 1. When the application is password definition, the gesture identifier 530 stores the sequence of gestures 1001 as the password in the gesture library 555 associated with the password application and outputs an action output 560 corresponding with an indication to the user that the password has successfully been stored. That is, upon receiving the action output 560 from the gesture identifier 530, the password application may display a message that indicates that a touch-less gesture-based password has been successfully stored and may indicate the domain to which the password applies if that was specified during password entry. When the application is password entry (as further discussed with reference to FIG. 11) such that Table 1 shows a series of gestures recognized by the gesture identifier 530, the gesture identifier 530 compares the series of gestures to the sequence of gestures 1001 stored in the associated gesture library 555 and outputs an action output 560 to indicate to the password application whether the device (or domain related functionality) should be unlocked.

Figure 11:
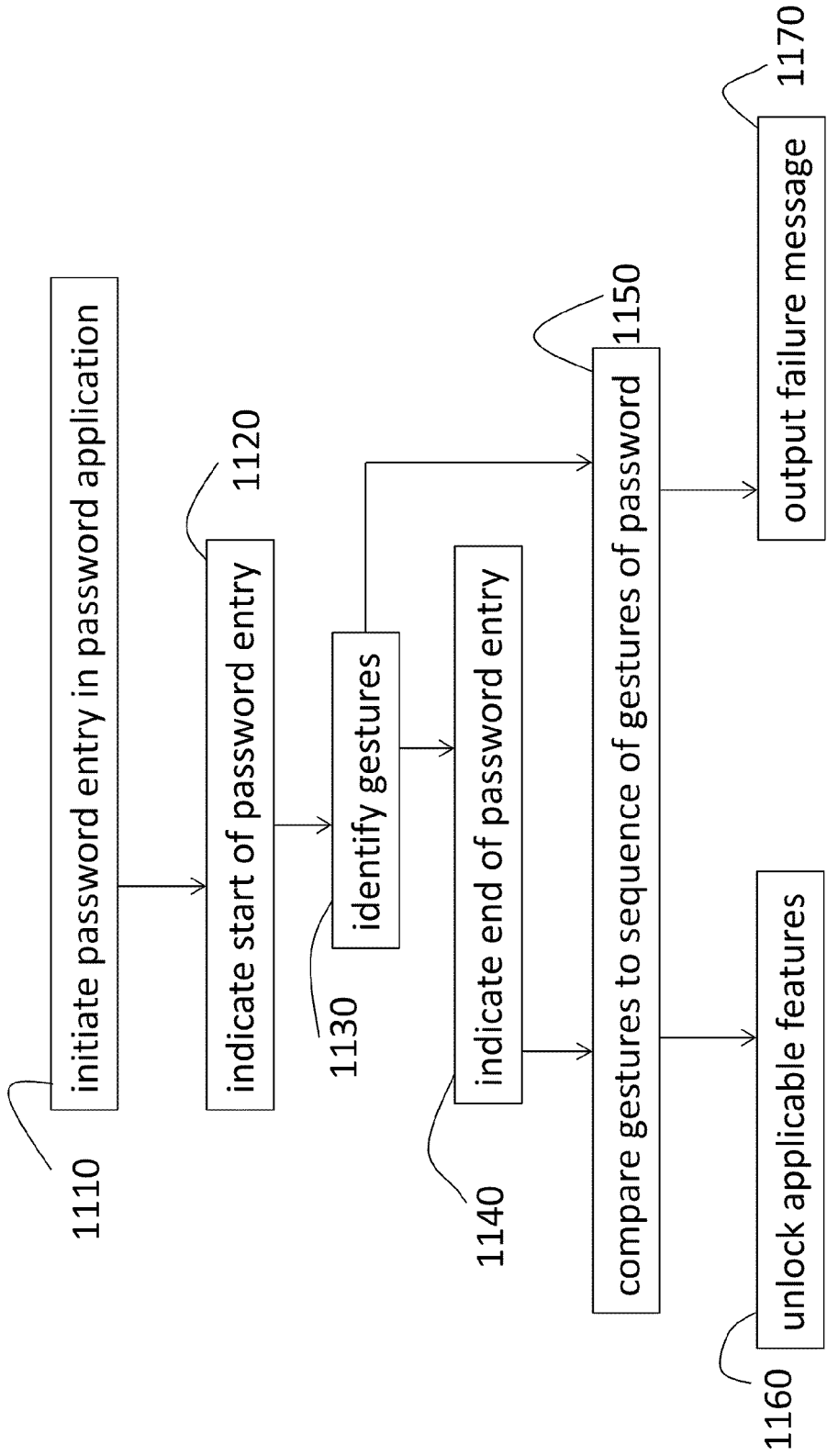
FIG. 11 is a process flow of a method of entry and recognition of a password by touch-less gesture according to an embodiment.

FIG. 11 is a process flow of a method of entry and recognition of a password by touch-less gesture according to an embodiment. To lock the device (after initiation of the password application and definition of the password according to the discussion with reference to FIG. 9 above), a key entry, touch-screen entry, gesture, or other selection may be made. The process discussed below with reference to FIG. 11 unlocks the device 100 or a specified domain of the device 100 based on a match with the expected password. At block 1110, initiating password entry in the password application causes the gesture library 555 associated with the password application (created as discussed with reference to FIG. 9) to be accessed by the gesture identifier 530. Although discussed as one password application here for convenience, defining a password and entering a password may involve different applications that may be executed by the same or different processors of the device 100. That is, defining the password and entering the password may be different selections or options of the same password application or may be different applications altogether.

Indicating the start of password entry at block 1120 alerts the gesture identifier 530 that the gestures following this indication are part of the entered password. At block 1130, identifying gestures made by an object 240 after the indication of the start of password entry also includes comparing each gesture to the sequence of gestures 1001 corresponding with the correct password, as discussed with reference to block 1150. Indicating the end of password entry at block 1140 ends the gesture identification at block 1130. Indicating the start and end of password entry (block 1120 and 1140) may be done by a gesture or other form of entry such as, for example, selection of a key or touch-screen item. At block 1150, comparing gestures to the sequence of gestures 1001 of the password corresponding with the device 100 or domain that the user wishes to unlock may be an ongoing process as indicated above. That is, as each gesture is identified at block 1130, the identified gesture may be compared with the expected gesture in the sequence of gestures 1001 rather than the comparing at block 1150 only occurring after all the gestures have been entered. When each identified gesture is compared with the sequence of gestures 1001 stored in the gesture library 555 as it is entered (rather than after all gestures have been entered), the first incorrect gesture may immediately lead to block 1170 which includes the gesture identifier 530 outputting a failure message as the action output 560. That is, if the sequence of gestures 1001 shown in FIG. 10 is the password, then when the second gesture that is entered and identified (block 1130) is a wave rather than a hovering at position 1010-2, the process may go to block 1170 to output a failure message to the user based on the gesture identifier 530 outputting a failure message as the action output 560. When all the gestures identified (block 1130) match all the gestures, in the correct sequence, of the sequence of gestures 1001, then at block 1160, unlocking the applicable features includes unlocking only the domain associated with the password, if a particular domain is associated with the password. At block 1160, unlocking the applicable features may include unlocking all the functionality of the device 100 when a domain is not associated with the entered password in the gesture library 555.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A device to use a password by touch-less gesture, the device comprising:
   two or more ambient light sensors arranged at respective surface locations of the device, each of the two or more ambient light sensors configured to measure light intensity at the respective surface location;
   a first processor configured to execute a password application on the device; and
   a second processor configured to detect two or more touch-less gestures performed by an object in touch-less communication with the device and define or verify a password based on the two or more touch-less gestures performed by the object in touch-less communication with the device, wherein the second processor detects the two or more touch-less gestures using light intensity measurements obtained from the two or more ambient lights sensors,
   wherein the second processor verifies the password when a password entry option of the password application is initiated, and responsive to verifying the password, the second processor:
      generates a signal to unlock functionality of a domain associated with the password, the domain being one of multiple domains specified in the device, each of the multiple domains having a unique password to unlock functionality of each respective domain; and
      outputs an indication that the domain associated with the password has been unlocked.

2. The device according to claim 1, wherein the second processor defines the password as the two or more gestures when a password definition option of the password application is initiated.

3. The device according to claim 2, wherein the first processor defines the password for the domain of the device.

4. The device according to claim 1, wherein the password entry option is initiated in response to detecting a minimum change in light intensity caused by the two or more touch-less gestures performed by the object.

5. The device according to claim 4, wherein the second processor verifies the password by comparing the two or more touch-less gestures with a defined password of a sequence of gestures.

6. The device according to claim 1, wherein the second processor generates a second signal to unlock functionality of the device based on verifying a second password, wherein the second signal is generated to unlock functionality of the device without receiving physical input at the device.

7. The device according to claim 1, wherein, responsive to verifying a second password associated with a second domain selected from the multiple domains, the second processor generates a second signal to unlock functionality associated with the second domain, the second domain being one of a work domain or a personal domain specified in the device, wherein the second signal is generated to unlock functionality of the work or personal domain without physical movement of the device.

8. The device according to claim 1, wherein the first processor and the second processor are two different processors of the device.

9. The device according to claim 1, wherein the first processor is a same processor as the second processor.

10. A method to use a password by touch-less gesture, the method comprising:

executing, using a first processor, a password application of a device, the password application facilitating definition of a password and entry of the password to unlock functionality of the device;

detecting, using light intensity measurements obtained from two or more ambient light sensors arranged at respective surface locations of the device, two or more touch-less gestures performed by an object in touch-less communication with the device; and defining or verifying the password in response to detecting the two or more touch-less gestures, wherein the password is defined or verified using a second processor, based on the two or more touch-less gestures performed by the object in touch-less communication with the device, wherein the second processor verifies the password when a password entry option of the password application is initiated, and responsive to verifying the password, the second processor:

generates a signal to unlock functionality of a domain associated with the password, the domain being one of multiple domains specified in the device, each of the multiple domains having a unique password to unlock functionality of each respective domain; and outputs an indication that the domain associated with the password has been unlocked.

11. The method according to claim 10, wherein the defining the password is based on a user initiating a password definition option of the password application, and wherein verifying the password is initiated based on detecting a minimum change in light intensity caused by the two or more touch-less gestures.

12. The method according to claim 11, wherein the defining the password includes setting the two or more touch-less gestures as a sequence of gestures defining the password.

13. The method according to claim 11, wherein the defining the password is for the domain of the device based on a user indication of the domain.

14. The method according to claim 10, wherein the verifying the password is based on a user initiating the password entry option of the password application, wherein the user initiates the password entry option using a hand as the object to perform the two or more touch-less gestures.

15. The method according to claim 14, wherein the verifying the password includes the second processor comparing the two or more touch-less gestures with a sequence of gestures defining the password.

16. The method according to claim 15, wherein the verifying the password includes validating the two or more touch-less gestures based on the comparing.

17. The method according to claim 10, further comprising the second processor generating a second signal to unlock functionality of the device in response to verifying that a second password is correct.

18. The method according to claim 17, wherein the generating the second signal unlocks functionality of the device without the user physically interacting with the device.

19. The method according to claim 15, further comprising the second processor generating an error signal to display an alert indicating a failed password based on the comparing.

20. The method according to claim 10, further comprising a user defining a new touch-less gesture for recognition by the second processor prior to the defining the password.

* * * * *